Figure 1:
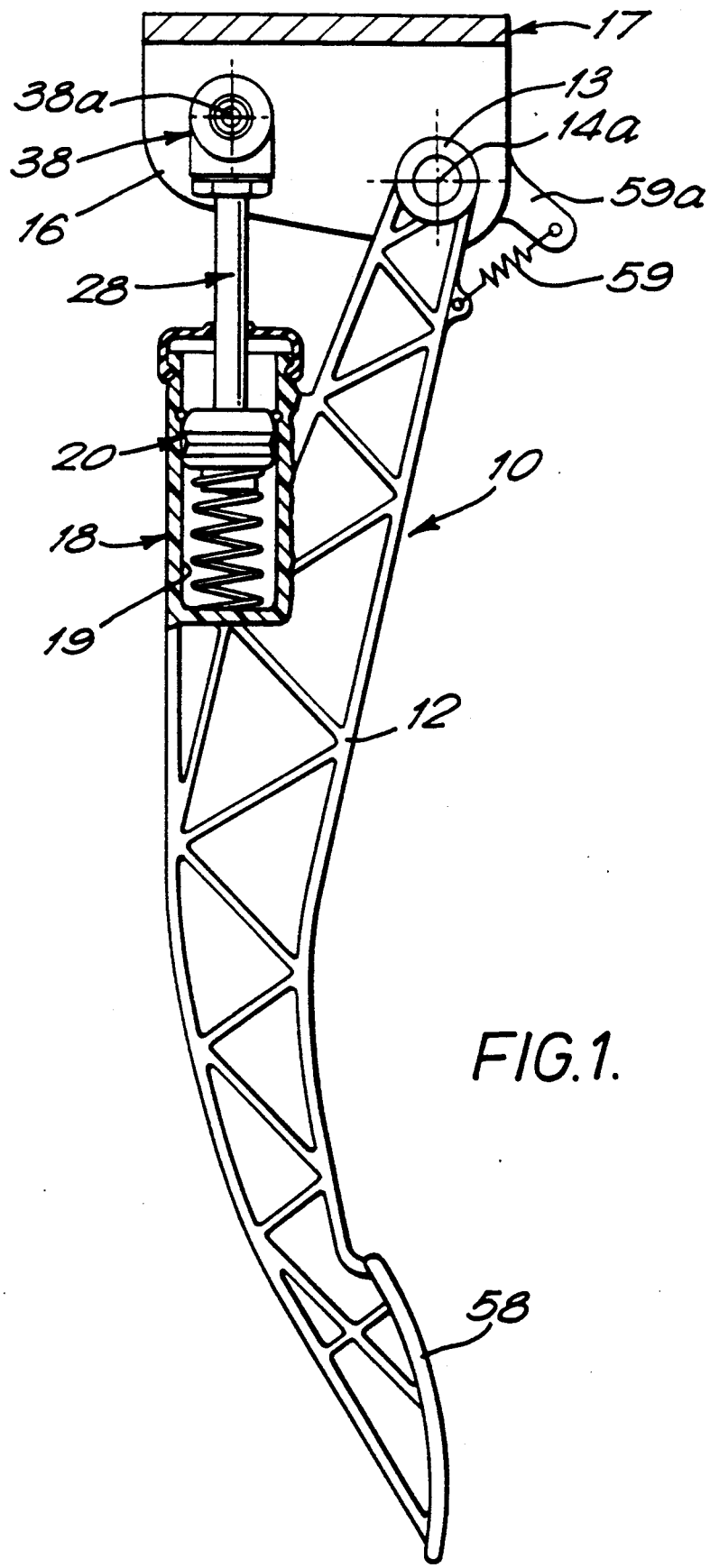

United States Patent [19]

Smith

[11] Patent Number: 5,090,201

[45] Date of Patent: Feb. 25, 1992

[54] FLUID PRESSURE ACTUATOR

[75] Inventor: Derek W. Smith, Wickford, England

[73] Assignee: Automotive Products plc, Warwickshire, England

[21] Appl. No.: 603,685

[22] PCT Filed: May 4, 1989

[86] PCT No.: PCT/GB89/00474

§ 371 Date: Oct. 31, 1990

§ 102(e) Date: Oct. 31, 1990

[87] PCT Pub. No.: WO89/11040

PCT Pub. Date: Nov. 16, 1989

[30] Foreign Application Priority Data

May 4, 1988 [GB] United Kingdom ................ 8810553

[51] Int. Cl.⁵ .......................... B60T 11/28; B15B 7/00
[52] U.S. Cl. .......................................... 60/589; 60/585;
60/533; 91/196; 91/217; 92/248; 92/118
[58] Field of Search .............. 92/118, 119, 248, 170.1,
92/248, 110; 91/196, 217; 60/533, 589, 585;
417/460, 464

[56] References Cited

U.S. PATENT DOCUMENTS

| | | | |
|---|---|---|---|
| 2,525,740 | 10/1950 | Trevaskis | 60/589 |
| 3,399,786 | 9/1968 | Honeycut | 92/119 |
| 4,910,962 | 3/1990 | Keane | 92/118 |
| 4,924,673 | 5/1990 | Barker et al. | 60/589 |
| 4,944,215 | 7/1990 | Nimmo et al. | 92/170.1 |

FOREIGN PATENT DOCUMENTS

| | | | |
|---|---|---|---|
| 3216885 | 11/1983 | Fed. Rep. of Germany | 60/533 |
| 82/02234 | 7/1982 | PCT Int'l Appl. | 92/172 |
| 206695 | 11/1923 | United Kingdom | 417/464 |

Primary Examiner—Edward K. Look
Assistant Examiner—Thomas Denion
Attorney, Agent, or Firm—Krass & Young

[57] ABSTRACT

The actuator comprises a clutch pedal lever (12) which is pivotally connected to a support (17). The pedal is integral with a cylinder (18) having a piston (20) therein which is connected to a hollow pushrod (28). The pushrod is also pivotally connected to the mounting (17). Pivoting movement of the pedal (12) causes the cylinder (18) to move relative to the piston so that fluid within the cylinder will operate a slave cylinder (44). The clutch and pushrod have spaced axes of pivoting (13a, 14a) and the piston (20) is shaped to permit a degree of tilting to take place between the piston and the cylinder. The system also includes a reservoir which can communicate with the cylinder when the piston occupies a particular position in the cylinder.

22 Claims, 8 Drawing Sheets

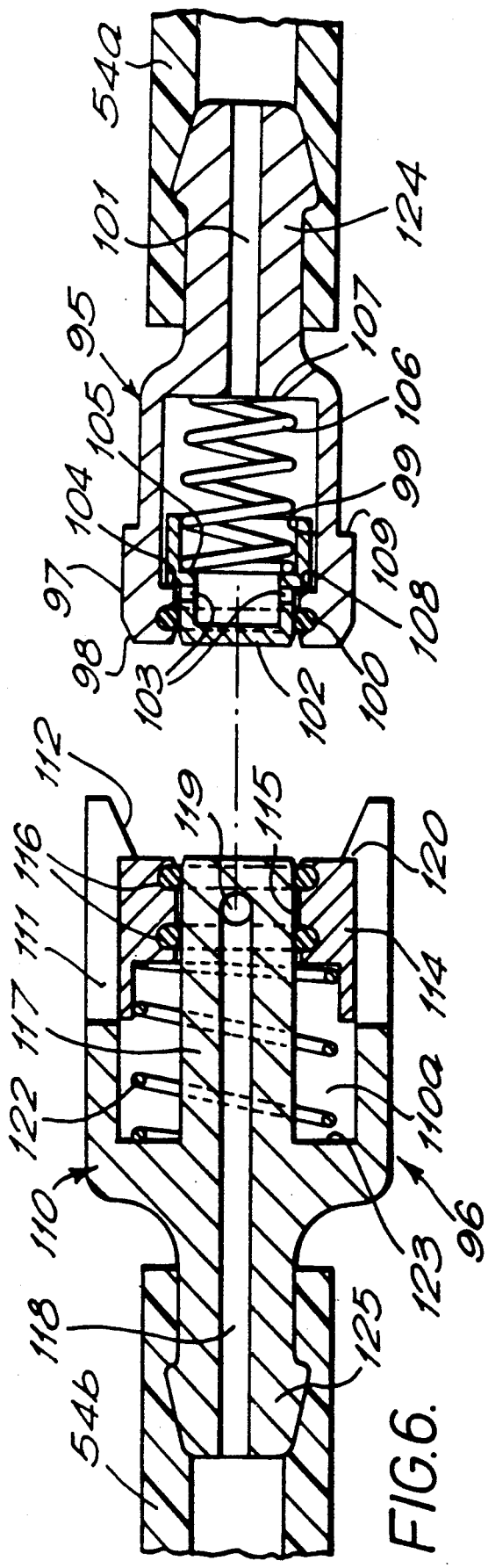
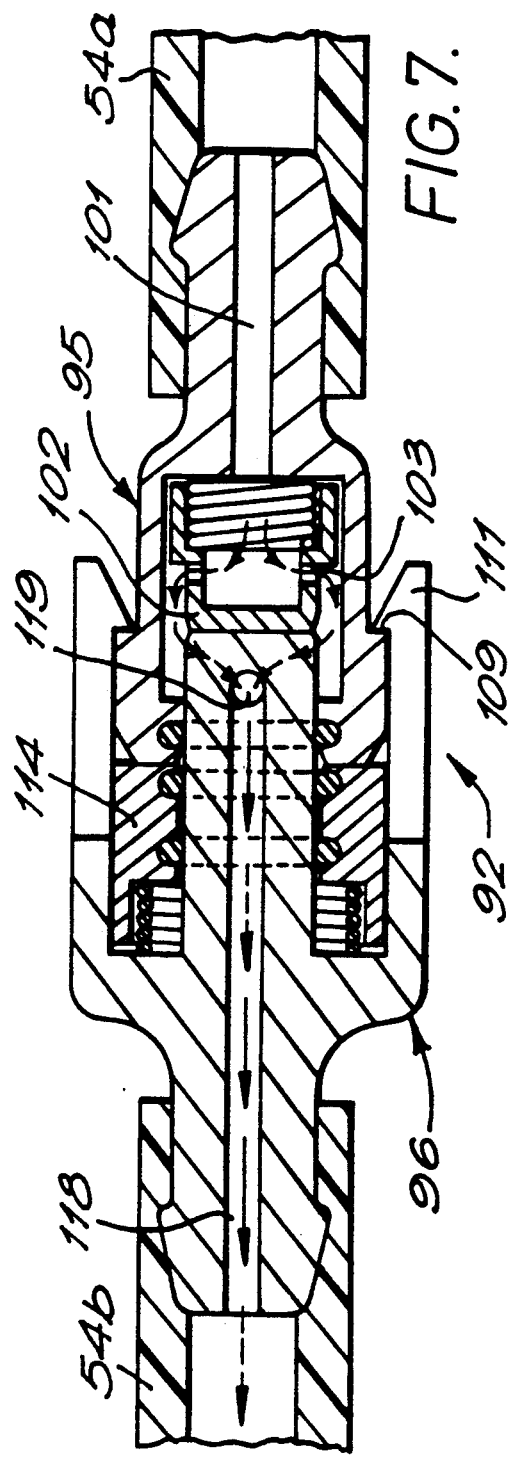

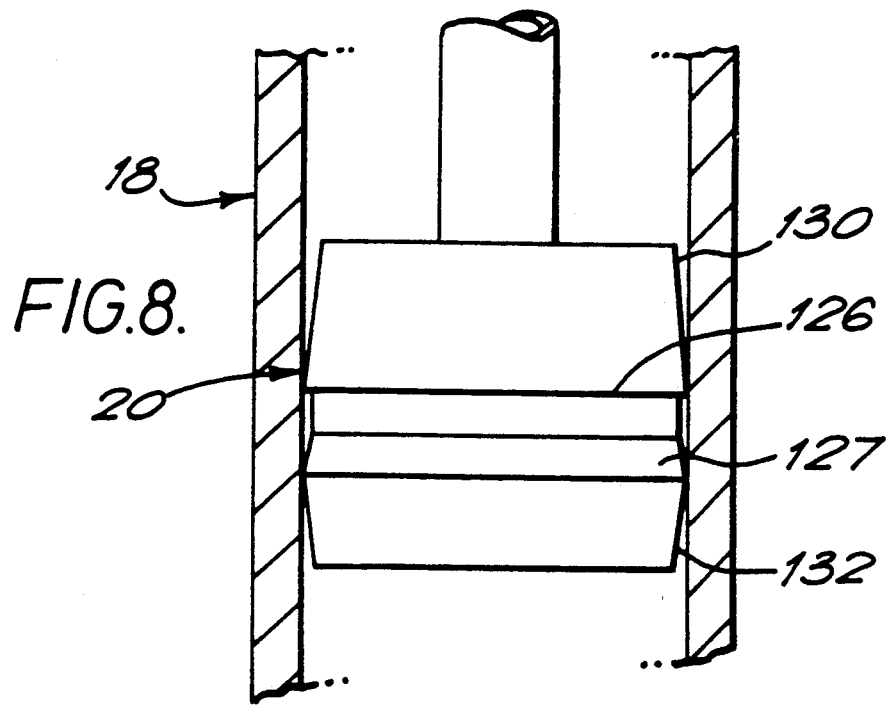
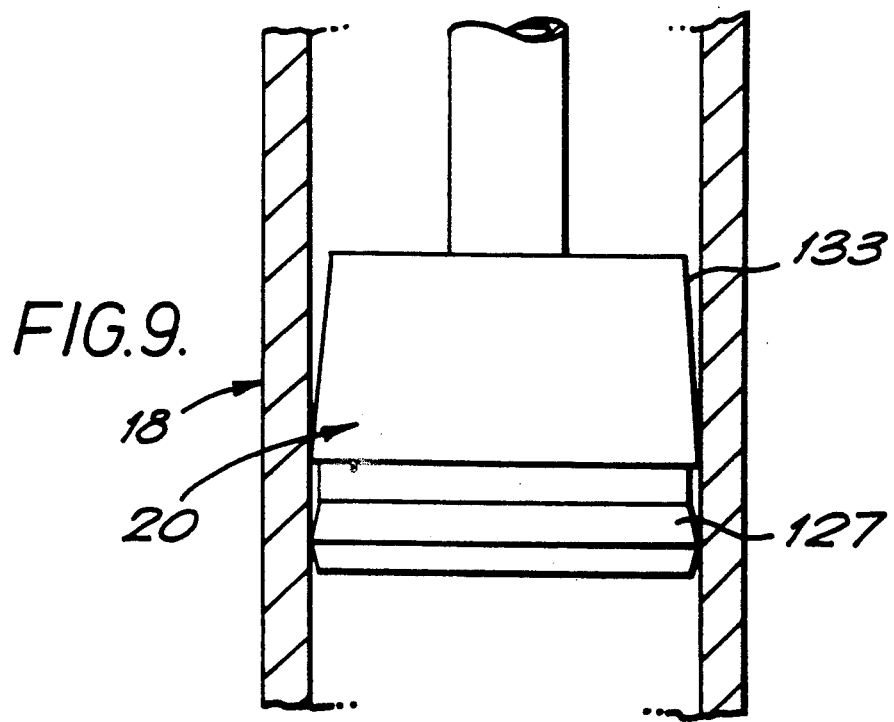

FLUID PRESSURE ACTUATOR

The invention relates to a fluid pressure actuator and is particularly, but not exclusively concerned with a fluid pressure actuator for controlling the clutch or brakes of a vehicle.

Hitherto, it has been commonplace to use a pedal in a vehicle which applies pressure and displacement to a pushrod arranged to operate a piston contained within a separate hydraulic master cylinder assembly. The pressure is then transmitted through a hydraulic line to operate a hydraulic slave cylinder for operating, e.g., a clutch of the vehicle.

It has been proposed hitherto to provide a pedal having a cylinder thereon for operating a remote slave cylinder. Examples of such pedals are described in WO87/03344 and EP-A-0293082.

In WO87/003344, it is necessary to provide a camming arrangement which causes a piston to move into the cylinder during pivoting movement of the pedal. In EP-A-0293082 it is necessary for the cylinder to be pivotally mounted on the pedal and for an operating rod of the piston to be pivotally mounted to a bracket on the vehicle bulkhead.

An object of the present invention is to provide an improved actuator which, in particular, avoids the need for a camming device.

According to the invention there is provided a fluid pressure actuator comprising a cylinder rigid with a lever to be mounted for pivoting about an axis, the piston being axially slidable in said cylinder, the piston having an operating member extending therefrom to be mounted at a position remote from the piston for pivoting about a further axis spaced from the axis of pivoting of the lever, the operating member being arranged to tilt relative to the cylinder during pivotal movement of the lever.

With there being one pivotal mounting for the lever and one pivotal mounting for the operating member, an additional pivot as in EP-A-0293982 is not required and it is unnecessary to provide a caming arrangement as described in WO87/03344.

The tilting of the operating member relative to the cylinder can be accommodated by appropriate shaping of the piston. For example, the piston may be tapered from a position adjacent one end to enable it to tilt within the cylinder or it may alternatively be barrel-shaped. Such an arrangement provides a simple and convenient way of accommodating the tilting movement of the piston and is particularly advantageous in that respect.

The operating member may be a tubular rod through which fluid from the actuator passes to operate a device such as a slave cylinder. The tubular rod may be connected to or may be integral with a hollow mounting through which fluid passes. The axis of pivoting of the tubular rod may, in such a case, be an axis of pivoting for the hollow mounting. The hollow mounting may include passage means for communication with a reservoir. The reservoir may be of a remotely located type connected to the hollow mounting by means of a suitable conduit.

The operating member may be associated with a valve which enables the cylinder to communicate with a reservoir when the piston occupies a given position within the cylinder. The valve may comprise a seal associated with the operating member which may be arranged to permit or prevent communication with the reservoir. The seal may be an annular seal arranged to engage a surface surrounding an orifice leading to, e.g., the slave cylinder.

The operating member may be axially rigid with the piston and movement of the cylinder towards a rest position may permit the operating member to cause the valve to permit communication with the reservoir. Movement of the piston away from the rest position may then cause the valve to engage the surface around the orifice to inhibit communication between the cylinder and the reservoir.

The valve may be at an end of the operating member adjacent the piston.

In another embodiment the operating member may be axially movable relative to the piston and movement of the piston towards a rest position may, in that case, cause the operating member to operate the valve so as to permit communication with the reservoir.

The reservoir may be provided on the cylinder and may be defined within a gaiter or the like mounted on one end of the cylinder. In such a case, fluid from the reservoir may be arranged to communicate with the cylinder when the piston is at a given position within the cylinder by flowing through slots in the operating member.

Stop means may be provided for retaining the piston in the cylinder.

Spring means may be provided for biasing the piston towards one end of the cylinder, the spring preferably being arranged to bias the piston towards the stop means.

Movement of the cylinder towards its rest position preferably causes the stop means to move the piston axially thereby operating the valve to permit communication with the reservoir.

As mentioned above, the operating rod is preferably hollow and provides a very convenient duct along which the fluid can pass from the cylinder to operate a device. The hollow operating member also provides a convenient means of enabling fluid to pass between the reservoir and the cylinder when the piston occupies a given position in the cylinder.

Normally, the valve will close to inhibit flow of fluid between the reservoir and the cylinder at the onset of pivoting of the lever to operate the external device such as the slave cylinder.

Figure 1A:
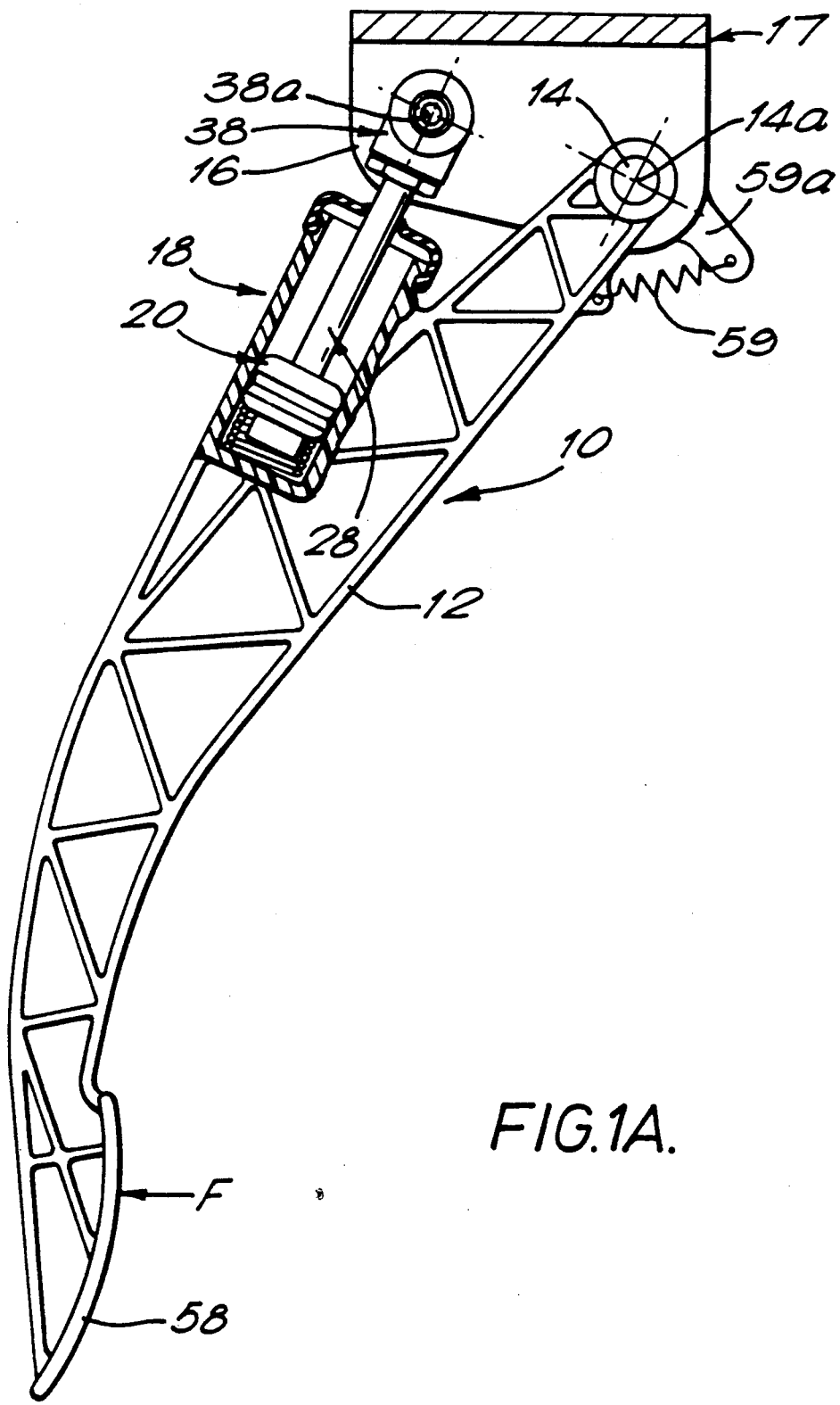

A fluid pressure actuator in accordance with the invention will now be described by way of example with reference to the accompanying drawings in which:

FIG. 1 is an elevation of an actuator in accordance with the invention shown partly in cross-section, FIG. 1A is a view similar to FIG. 1 showing the actuator in a pivoted position.

Figure 2:
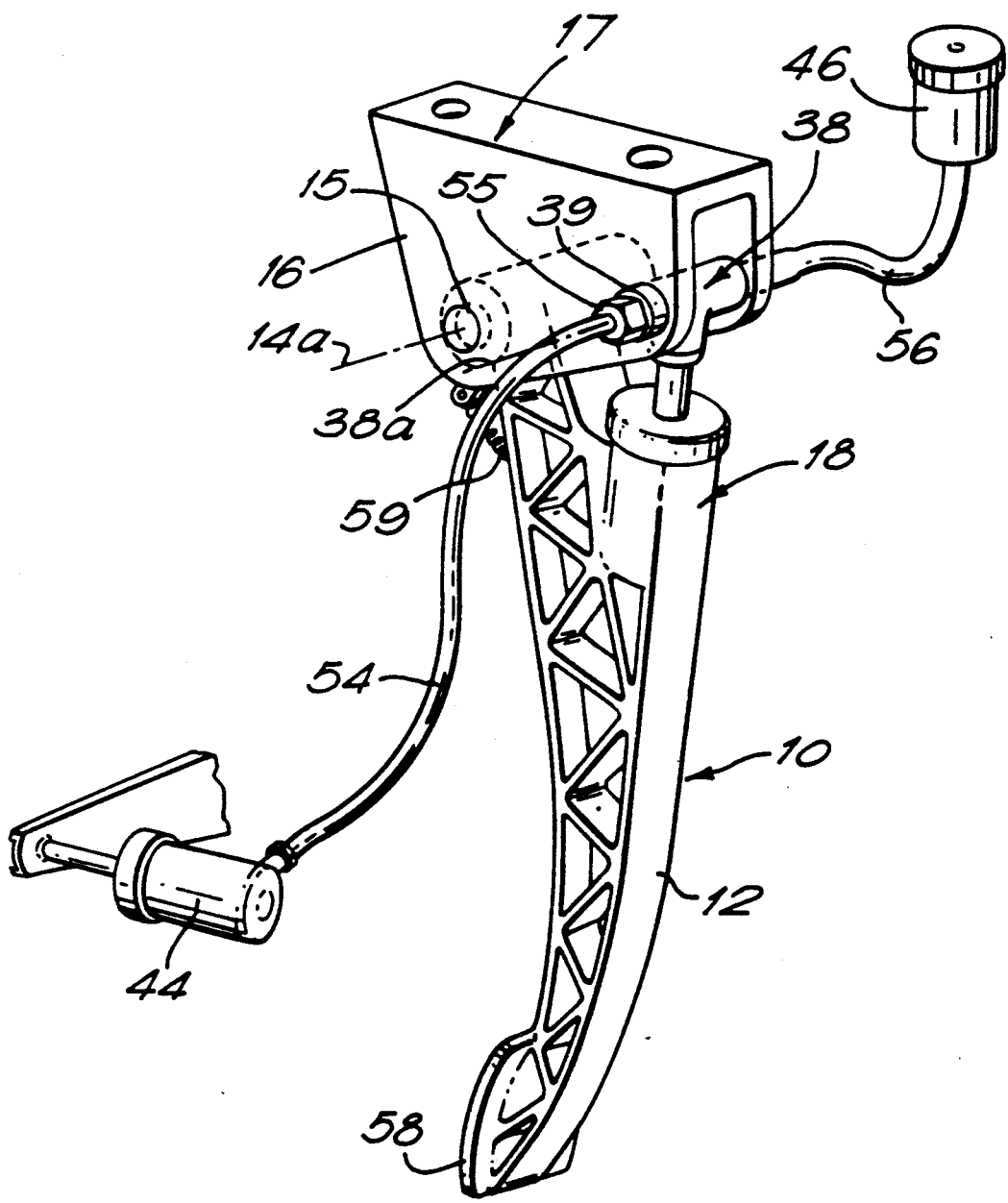
Figure 3:
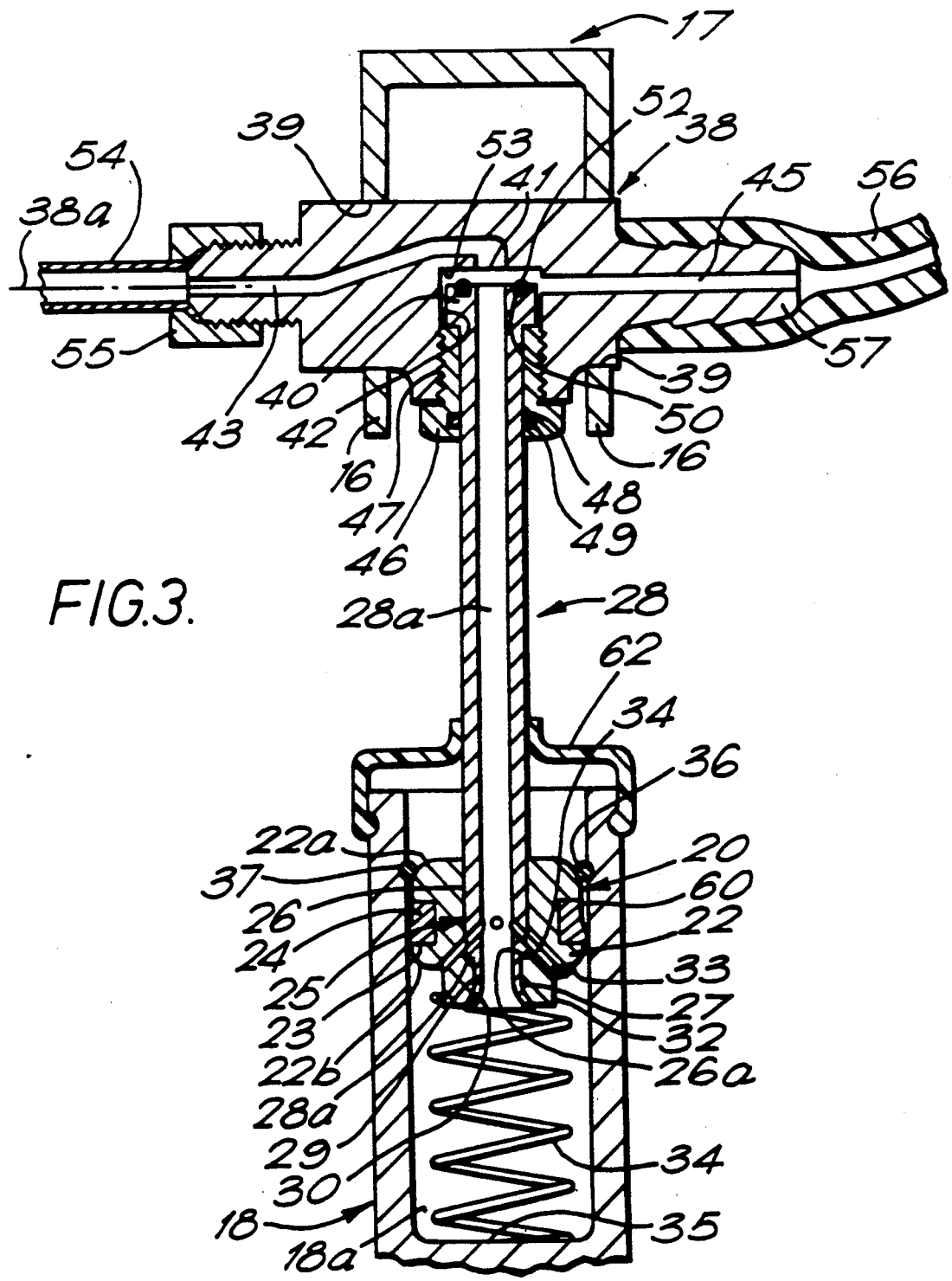
Figure 4:
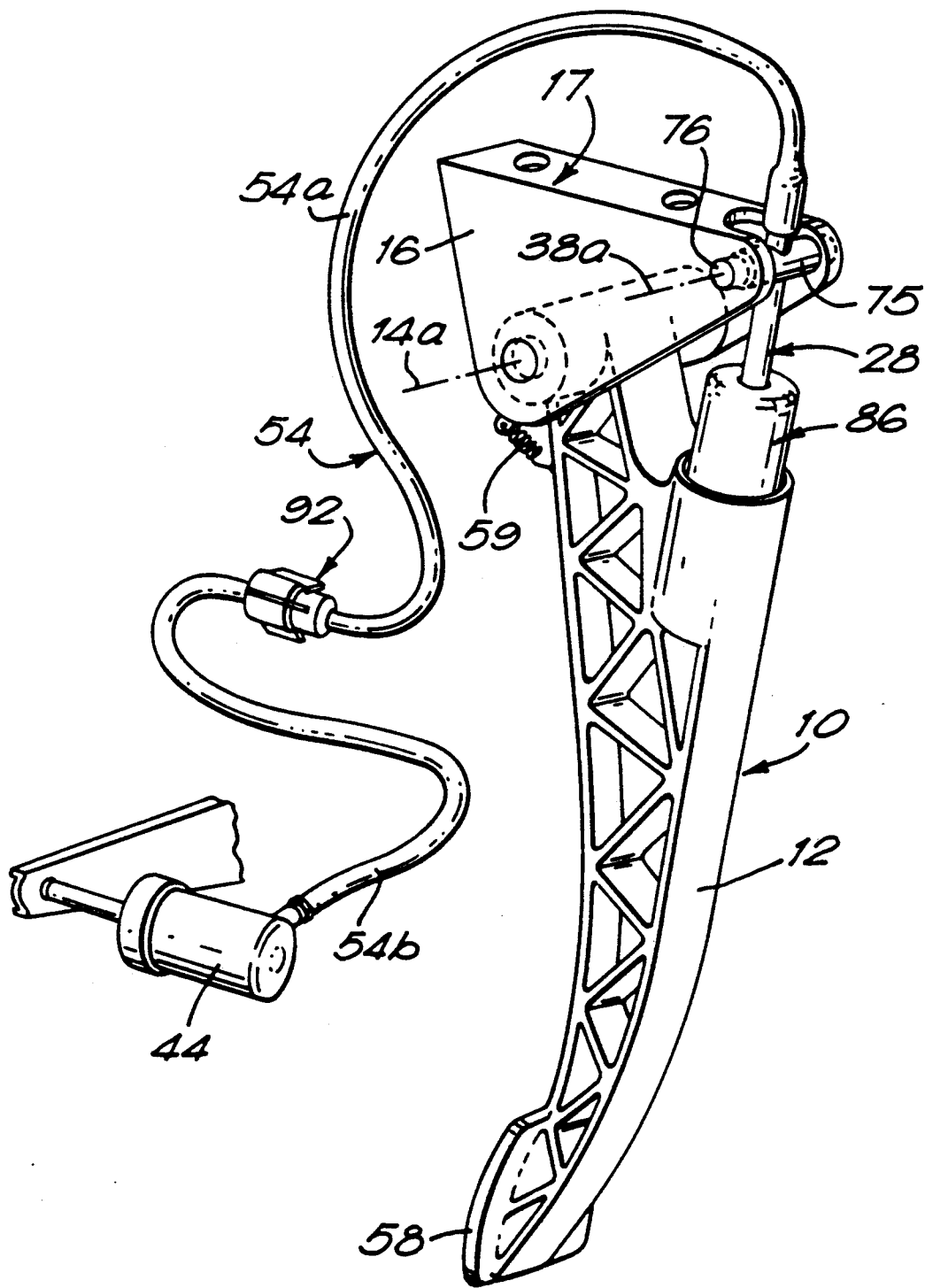
Figure 5:
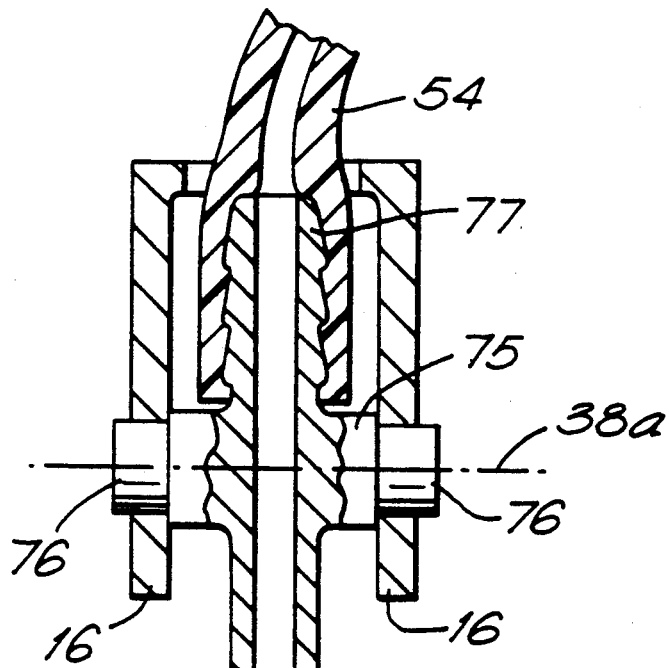
Figure 5:
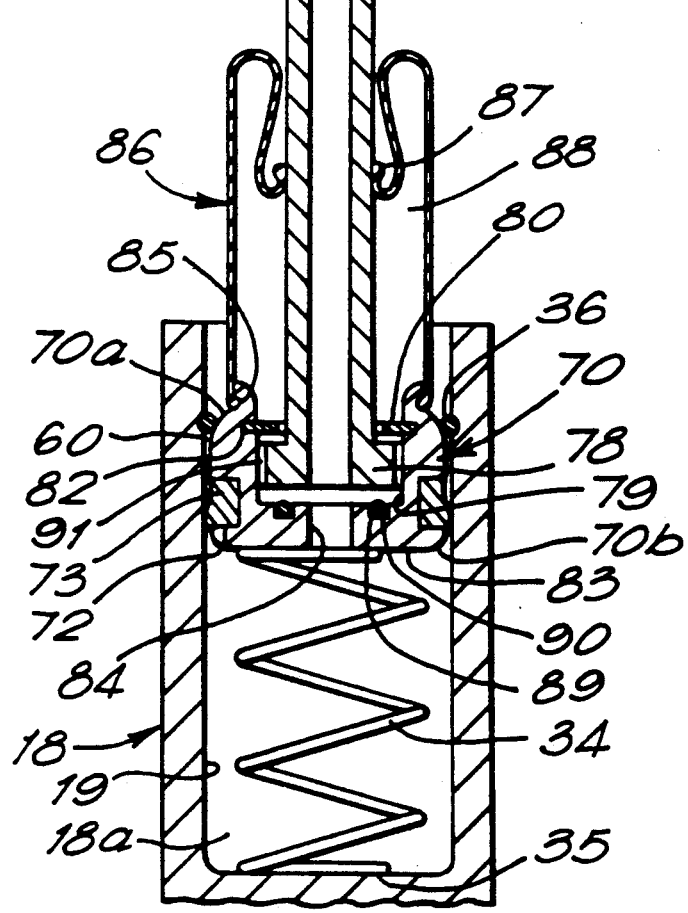

FIG. 2 is a perspective view of the actuator shown in FIG. 1 illustrating connections to a reservoir and slave cylinder, FIG. 3 is a cross-section through a piston and cylinder of the actuator illustrating a valve arrangement controlling flow of fluid from the reservoir, FIG. 4 is a perspective view of an alternative type of actuator having a sealed reservoir, FIG. 5 is a cross-section through a cylinder of the actuator of FIG. 4 illustrating a valve arrangement for controlling flow of fluid between the cylinder and the reservoir, FIG. 6 is a cross-section through a two-part connector for use in connecting the actuator shown in FIGS. 4 and 5 to a slave cylinder, the connector parts being shown disconnected,

FIG. 7 is a view of the connector parts shown in FIG. 6 in a connected condition, FIG. 8 is a cross-section through part of a cylinder of an actuator in accordance with the invention showing another type of piston, and FIG. 9 is a view similar to FIG. 8 illustrating a further type of piston.

Referring to FIGS. 1-3, an actuator indicated generally at 10 comprises a clutch pedal lever 12 having a boss 13 housing a shaft 14. The shaft 14 is pivotally mounted in coaxial apertures 15 formed in parallel flanges 16 of a bulkhead mounting bracket 17 and defines an axis of pivoting 14a. The bracket 17 can be suitably secured to a bulkhead or firewall (not shown) of a vehicle. The pedal 12 is moulded from plastics material so as to form an integral cylinder 18. The cylinder 18 defines a cylindrical bore 19 in which a piston 20 is slidably located. The piston is shown in detail in FIG. 3 and comprises an annular piston member 22 having an external peripheral groove 23 in which a seal 24 is located. The seal 24 sealingly engages the wall of bore 19. The piston member 22 is formed with a through bore 25 which includes a counterbore 26 and a reduced diameter bore 27. The counterbore 26 forms a shoulder 26a on the piston member 22. A hollow pushrod 28 fits into the piston member 22 and has a reduced diameter portion 29 located within the reduced diameter bore 27. A shoulder 28a is defined between the main section of the pushrod and the reduced diameter section 27. The lower end of the pushrod 28 as viewed in the drawings is bent outwardly at 30 with shoulders 26a, 28a in interengagement so as to secure the piston member 22 to the piston rod 28. The piston member 22 is formed with a reduced diameter section 32 so as to define a shoulder 33. A spring 34 extends between a lower end wall 35 of the cylinder 18 and the shoulder 33. Four bores 34 extend between a bore 28a of the pushrod 28 and the shoulders 33. The spring 34 normally urges the piston member 22 against a snap-ring 36 in a groove 37 in the cylinder. The snap-ring 36 forms a stop for the piston 20.

The upper end of the pushrod 28 is housed within a valve unit 38 which is pivotally mounted in apertures 39 in the flanges 16 of mounting bracket 17 for pivoting about an axis 38a. The pushrod 28 has an enlarged head 40 located in a bore 42 which communicates via an orifice 41 with a passageway 43 leading to a slave cylinder 44 and communicates through a further passageway 45 with a reservoir 46. The pushrod 28 is retained in the bore 42 by means of a screw-threaded retainer 46 which screws into a screw-threaded section 47 of the bore 42. The retainer 46 is formed with a groove 48 which houses a seal 49 sealingly engaging the pushrod 28. The upper end of the head 40 has an annular groove 50 therein which houses a seal 52. The seal 52 acts as a valve and is engageable with an annular face 53 of the valve unit which surrounds the orifice 41.

The passage 43 communicates with the slave cylinder 44 through flexible conduit 54 which may be secured to the valve unit 38 by means of a screw-threaded retainer 55. The communication with the reservoir 46 is likewise through conduit 56 which is push-fitted onto an extension 57 on the valve unit 38.

In use, the cylinder 18, pushrod 28, valve unit 38, conduit 54, 56 and slave cylinder 44 are filled with hydraulic fluid and bled of any air. In that condition, the piston and cylinder will normally occupy a rest position as shown in FIG. 3. To operate the slave cylinder, a force F (FIG. 1A) is applied to a foot-engaging pad 58 so as to pivot the pedal 12 about the axis 14a thereby causing the cylinder 18 to move upwardly. The initial upward movement of the cylinder enables the piston 20 to move upwardly under the influence of spring 34 until the seal 52 engages the annular surface 53 around orifice 41 thereby preventing communication between a lower chamber 18a of the cylinder 18 and the reservoir 46. Further upward movement of the cylinder 18 then causes fluid to move from chamber 18a through pushrod bore 28a directly and via bores 34, the fluid passing through passageway 43 and conduit 54 to operate the slave cylinder 44. On removing the load F, the clutch pedal 12 pivots in a reverse sense under the influence of a clutch operated by slave cylinder 44, the spring 34 and a clutch lever return spring 59 connected between the clutch pedal 12 and an arm 59a on the bracket 17.

The axis of pivoting 38a of valve unit 38 and the axis of pivoting 14a of the pedal 12 are spaced apart and, therefore, the pivotal movement of the pedal 12 will cause the pushrod 28 to tilt slightly relative to the cylinder 18 as seen in FIG. 1A. Such tilting is accomodated by forming the piston member 22 so as to define a clearance 60 between the bore 19 of cylinder 18 and the periphery of the piston member 22 and by forming the piston member 22 with spherical upper and lower sections 22a, 22b. In that way, the piston 20 and pushrod 28 can tilt relative to the cylinder.

To prevent ingress of foreign matter into the cylinder 18, a flexible seal 62 is mounted on the cylinder and slidably engages the pushrod 28.

FIGS. 4 and 5 show an alternative actuator where the reservoir is mounted on the piston. Parts in FIGS. 4 and 5 which generally correspond to parts shown in FIGS. 1-3 carry the same reference numerals and will not be described in detail.

In FIGS. 4 and 5, the piston 20 includes an alternative form of piston member 70 having a peripheral groove 72 which houses a seal 73 in sealing engagement with the bore 19 of cylinder 18. A hollow piston rod 28 is integral with a mounting 75 at its upper end having stub shafts 76 thereon pivotally mounted in the side plates 16 of bracket 17. The upper end of the pushrod 28 has an extension 77 secured to conduit 54.

The lower end of the pushrod 28 is formed with a head 78 which is retained slidably within a bore 79 of the piston member 70 by means of a snap-ring 80. The snap-ring 80 locates in a groove 82 formed in the piston member 70. The piston member 70 has an end wall 83 formed with a through bore 84. The end wall 83 of the piston engages a return spring 34 which extends between the end wall 33 and an end face 35 of the cylinder 18. The piston member 70 has an external groove 85 to which a flexible gaiter 86 is snap fitted. The gaiter 86 has an inner end 87 which grips the pushrod 28 to define a reservoir 88 for fluid.

The end wall 83 of the piston member 72 is formed with an annular groove 89 which houses a seal 90 which co-operates with the head 78 to act as a valve.

The head 78 of the pushrod 28 is formed with a plurality of axial slots 91.

The flexible conduit 54 may be connected to the slave cylinder 44 either directly or via a self sealing connector 92 described below.

The cylinder 18 is provided with a snap-ring 36 as in FIGS. 1-3 against which the piston member 70 is normally urged by means of the spring 34.

In use, the system is filled with hydraulic fluid bled of air as described with reference to FIGS. 1-3. When the clutch pedal 12 is pivoted under the influence of force F, the cylinder 18 initially moves upwardly relative to the pushrod 28 thereby causing the lower surface of head 78 to sealingly engage the seal 90. In that way, communication between a lower chamber 18a of the cylinder and the reservoir 86 is prevented. Further upward movement of the cylinder 18 causes end wall 35 to move towards the piston 70 and fluid is thereby forced from chamber 18a through the pushrod 28 to the slave cylinder 44.

When the force F is removed, the clutch pedal 12 returns to its rest position under the influence of the clutch released by the slave cylinder 44, the spring 34 and the clutch lever return spring 59. As the cylinder 18 moves towards its FIG. 5 position, the head 78 of the piston rod 28 will eventually disengage the seal 90 to permit communication between the reservoir 88 and the fluid in the chamber 18a of cylinder 18 via the grooves 91 and the bore 84. The gaiter 86 will expand or collapse as the volume of hydraulic fluid contained within it changes.

As with the arrangement shown in FIGS. 1-3, the spacing of the pivotal axis 14a, 38a will cause the pushrod 74 to tilt relative to the cylinder 18 during upward and downward movement of the cylinder. That can again be accommodated by providing a clearance 60 between the piston member 70 and the bore 19 and by forming the piston member 70 with spherical upper and lower sections 70a, 70b.

The arrangement shown in FIGS. 4 and 5 lends itself particularly to a pre-filled and pre-bled system. To ease assembly into a vehicle in such a case, the self sealing connector 92 may be provided to connect portions 54a and 54b of the conduit 54.

The connector 92 comprises a male part 95 and a female part 96. The male part comprises an annular leading section 97 having a bevelled leading edge 98 and defining a bore 99. The leading section 97 supports a seal 100 which sealingly engages a valve member 102. The valve member 102 is cup-shaped and defines radial ports 103 adjacent a shoulder 104. The valve 102 defines an internal shoulder 105 which locates a spring 106 extending between the shoulder 105 and an end wall 107 of the male member. The spring 106 normally urges the shoulder 104 of the valve member 102 against a shoulder 108 on the leading section 197. The male member has an external shoulder 109 thereon and also has a tubular projection 124 for a conduit part 54a leading to the actuator.

The female member 96 includes a body 110 formed with a plurality of leading latch-fingers 111 formed with bevel lead-in surfaces 112. The body 110 has a cylindrical bore 110a therein in which an annular seal member 114 is slidably mounted. The annular seal member 114 has an inner surface 115 having spaced-apart 116 seals thereon in sealing engagement with a cylindrical projection 117 formed with an axial bore 118 and a radial port 119 between the two seals 116 and in communication with bore 118. The seal member 114 is normally urged into engagement with latch surfaces 120 on the fingers 111 by means of a spring 122 acting between an end face 123 of the female coupling 96 and the seal member 114. A tubular projection 125 is provided for a conduit part 54b leading to the slave cylinder 44.

To interconnect the male and female parts 95, 96 the male part 95 is introduced into the female part 96 so that the leading surfaces 98 of the male part initially engage lead-in surfaces 112 of the fingers 111. Continued movement of the parts 95, 96 towards each other causes the projection 117 to push the valve member 102 to the right and causes the fingers 112 to ride over the male section 95 until they eventually snap behind the shoulder 109 as shown in FIG. 7. Simultaneously, the male member pushes the seal member 114 to the left until the valve member 102 and seal member 114 take up the FIG. 7 position. In that position, fluid can flow through bore 101 in the male part 95 through ports 103, through port 119 in the female part and through bore 118 as shown by arrows in FIG. 7.

The interconnection between the male and female connector parts 95, 96 establishes a hydraulic link between the conduit parts 54a, 54b with minimal loss of fluid or introduction of air into the system.

FIGS. 8 and 9 illustrate alternative shapes for the pistons.

In FIG. 8, the piston 20 is substantially barrel-shaped to permit tilting of the piston within the cylinder bore 19. The piston is formed with a suitably shaped groove 126 for a seal 127 which sealingly engages the wall 19. The barrel-shape provides tapering clearances 130, 132 which permit sufficient degree of tilting of the piston and pushrod about the seal relative to the cylinder 18.

In FIG. 9, the seal 127 is located adjacent one end of the piston 20 and the piston member tapers towards its upper end providing a tapering clearance 133. The clearance 133 permits a degree of tilting about the seal 127.

In all of the embodiments described with reference to the accompanying drawings, tilting of the piston does not affect the sealing engagement between the seal on the piston and the wall of the cylinder.

The cylinder 18 may have a metal cylinder liner press fitted or moulded therein to reduce wear, friction or porosity.

Although in FIG. 1 the hydraulic fluid passes through a hollow pushrod 28, the fluid could be tapped from a port in the wall of the cylinder 18.

The reservoir allows topping up with hydraulic fluid for displacement or wear compensation and/or bleeding of the system to remove air.

In FIG. 2, the reservoir 46 may be sealed by a flexible diaphragm and such a system may lend itself to being pre-filled for shipping and installation. Alternatively, the reservoir may be open to the ambient air.

The actuator may be used to operate brakes instead of a clutch. In another application, the lever may be a hand operated lever instead of a clutch or brake pedal.

I claim:

1. A hydraulic master cylinder comprising a lever to be mounted at one end for pivoting about a pivot axis, the other end being an operating end of the lever, a cylinder rigid with the lever and having a blind bore, the open end of said bore being adjacent the pivot axis, and the base of the bore being adjacent the operating end of the lever, a piston axially slidable in said cylinder, the piston having an operating member extending out of the open end of the bore, the operating member being mountable at a position remote from the piston for pivoting about a further pivot axis spaced from the axis of pivoting of the lever, and the operating member being generally coaxial of the bore and being arranged to tilt relative to the cylinder during pivotal movement of the lever.

2. An actuator according to claim 1 in which the piston is arranged to tilt relative to the cylinder during pivotal movement of the lever.

3. An actuator according to claim 2 in which the piston is shaped to permit relative tilting between the piston and cylinder.

4. An actuator according to claim 3 in which the piston has a tapering configuration.

5. An actuator according to claim 3 in which the piston has a barrel-like configuration.

6. An actuator according to claim 1 in which the operating member is a tubular rod through which fluid from the actuator passes to operate a device.

7. An actuator according to claim 6 in which the tubular rod is connected to or integral with a hollow mounting through which fluid passes, the mounting being pivotal to permit pivotal movement of the tubular rod.

8. An actuator according to claim 7 in which the hollow mounting includes passage means for communication with a reservoir.

9. An actuator according to claim 1 in which the operating member is associated with a valve which enables the cylinder to communicate with a reservoir.

10. An actuator according to claim 9 in which the valve comprises a seal associated with the operating member which is arranged to permit or prevent communication between the cylinder and the reservoir.

11. An actuator according to claim 10 in which the seal is at an end of the operating member remote from the piston.

12. An actuator according to claim 11 in which the operating member is axially rigid with said piston and movement of the cylinder towards a rest position permits the operating member to cause the valve to permit communication with the reservoir.

13. An actuator according to claim 10 in which the valve is at an end of the operating member adjacent the piston.

14. An actuator according to claim 13 in which the operating member is axially movable relative to the piston and movement of the cylinder towards a rest position causes the operating member to operate the valve so as to permit communication with the reservoir.

15. An actuator according to claim 9 in which the reservoir is remotely located and communicates with the cylinder through conduit.

16. An actuator according to claim 9 in which the reservoir is provided on the cylinder.

17. An actuator according to claim 16 in which the reservoir is defined within a gaiter mounted on one end of the cylinder.

18. An actuator according to claim 17 in which the operating member passes coaxially through the reservoir.

19. An actuator according to claim 1 in which stop means is provided for retaining the piston in the cylinder.

20. An actuator according to claim 19 in which spring means is provided for biasing the piston normally towards the stop means.

21. An actuator according to claim 19 in which movement of the cylinder towards its rest position causes the stop means to move the piston axially thereby operating the valve to permit communication with the reservoir.

22. An actuator according to claim 1 in which the lever and cylinder are formed as a one piece unit.

* * * * *